(No Model.)
A. ALDERMAN.
COMBINED RAKE AND PITCHFORK.
No. 313,843. Patented Mar. 17, 1885.
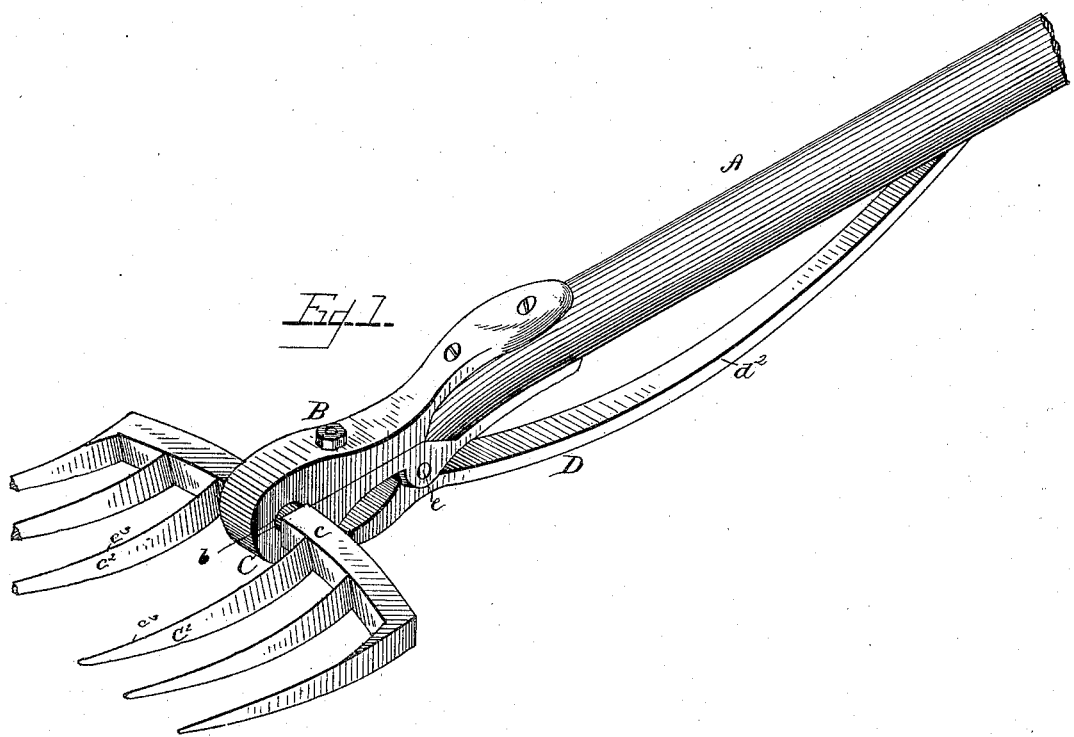
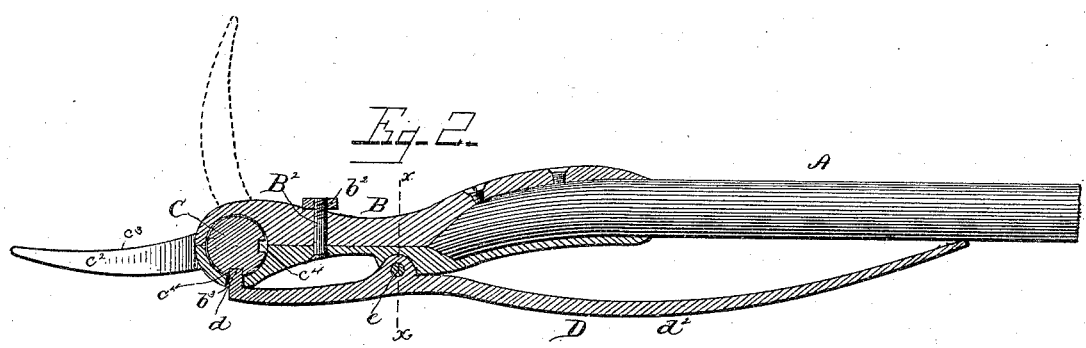
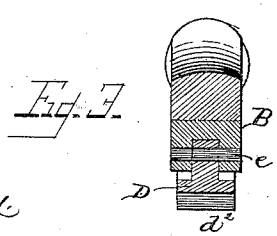
WITNESSES
F. L. Durand
J. B. Noyes
A. Alderman,
INVENTOR
by
J. R. Littell,
Attorney.

UNITED STATES PATENT OFFICE.

ASA ALDERMAN, OF CALVARY, GEORGIA.

COMBINED RAKE AND PITCHFORK.

SPECIFICATION forming part of Letters Patent No. 313,843, dated March 17, 1885.

Application filed October 22, 1884. (No model.)

*To all whom it may concern:*

Be it known that I, A. ALDERMAN, a citizen of the United States, residing at Calvary, in the county of Decatur and State of Georgia, have invented certain new and useful Improvements in a Combined Rake and Pitchfork; and I do hereby declare that the following is a full, clear, and exact description of the invention, which will enable others skilled in the art to which it appertains to make and use the same.

This invention relates to an improved tool combining a rake and pitchfork; and the object of my invention is to provide a simple and improved tool of this class which will possess advantages in point of inexpensiveness, durability, and general efficiency, and which can be readily and conveniently converted into either a rake or pitchfork.

In the drawings, Figure 1 is a perspective view illustrating my invention. Fig. 2 is a longitudinal sectional view of the same, showing it as a fork, the adjustment by which it is converted into a rake being illustrated by dotted lines. Fig. 3 is a detail transverse sectional view taken on the line $x\,x$, Fig. 2.

Corresponding parts in the figures are denoted by the same letters of reference.

Referring to the drawings, A designates the handle, which may be formed of a suitable rod or bar, and carries an arm or casting, B, at its end. This projecting arm is provided with an eye, $b$, forming the bearing for the rake-head, and it is preferably constructed in two sections, as shown, respectively secured by screws, or in any other suitable manner, to the end of the handle-bar, and clamped together by means of a screw or bolt, $B^2$, secured by a nut, $b^2$.

C designates the rake-head, which comprises the usual cross-piece or head, $c$, from which project the teeth $c^2$. The cross-piece $c$ has its bearing in the perforation $b$, and is provided, preferably, with shoulders at each side its cylindrical bearing portion, to obviate lateral movement or displacement. The rake-teeth are preferably beveled to form a sharp edge, $c^3$, which will cut its way through long grass or similar obstruction, and which will efficiently gather straw or other litter therefrom. From the bearing eye or perforation $b$ extends a lateral opening, $b^3$, and in the head $c$ are provided two notches, $c^4$, adapted to register with this opening $b^3$. These notches are respectively engaged to convert the device into a rake or pitchfork by the end or point $d$ of a lock-lever, D, fulcrumed by means of a pin, $e$, or in any other suitable manner, to the projecting arm B, and comprising a spring portion, $d^2$, in rear of its fulcrum, this spring portion being adapted to be readily operated by the hand to govern the lever.

The operation and advantages of my invention will be readily understood by those skilled in the art to which it appertains. When the rake-head is adjusted at about right angles to the handle-bar, and secured in this position by the engagement of the point of the spring-lever with one of the notches in the head, the device is adapted for use as a rake. When it is desired to remove the accumulation of straw or other litter accumulated by the rake, the head C may be readily adjusted to the position shown in full lines, Fig. 2, when the device is adapted for convenient use as a fork.

I claim as my invention and desire to secure by Letters Patent—

1. The combination, in a convertible rake and fork, of a handle-rod having a projecting arm provided at its end with a transverse bearing-eye, and with the opening $b^3$ extending therefrom, a rake-head passing through said eye and bearing therein, and provided with the notches $c^4$, registering with the opening $b^3$, and a lever fulcrumed upon the under side of the handle, and having a point, $d$, passing through the opening $b^3$, and adapted to engage said notches, substantially as and for the purpose set forth.

2. The combination, in a convertible rake and fork, of a rod or handle, a rake-head having a transverse bearing at the end thereof and provided with the notches, an opening, $b^3$, being arranged to extend from the bearing, and the lock-lever fulcrumed upon the rod or handle, and comprising a point, $d$, entering the opening $b^3$, and a bowed spring portion, $d^3$, extending longitudinally of the handle-rod, and adapted to be compressed by the hand grasping the rod to disengage its point $d$, substantially as set forth.

3. The combination, in a convertible rake and fork, of the handle-rod, the two-part separable bearing-arm formed with the transverse bearing-eye at its end, an adjustable rake-head received by said eye, the clamping-bolt passed through the sections of the arm in rear of the bearing to secure the rake-head therein, and a lever fulcrumed upon one section of the arm, substantially as set forth.

In testimony whereof I affix my signature in presence of two witnesses.

ASA ALDERMAN.

Witnesses:
 J. S. M. DONALSON,
 A. F. HAND.